United States Patent
Tondepu et al.

(10) Patent No.: US 10,009,393 B2
(45) Date of Patent: Jun. 26, 2018

(54) JOINING AN ON-LINE MEETING FROM AN OFF-LINE MEETING

(71) Applicant: Microsoft Technology Licensing, LLC, Redmond, WA (US)

(72) Inventors: Madhuri Tondepu, Bellevue, WA (US); Melinda Katrina Lim, Seattle, WA (US); John Cole Bradley, Seattle, WA (US); Devi Brunsch, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 14/928,441

(22) Filed: Oct. 30, 2015

(65) Prior Publication Data

US 2017/0126756 A1    May 4, 2017

(51) Int. Cl.
G06F 15/16    (2006.01)
H04L 29/06    (2006.01)
H04L 29/08    (2006.01)

(52) U.S. Cl.
CPC .......... H04L 65/4038 (2013.01); H04L 67/02 (2013.01)

(58) Field of Classification Search
CPC ..................... H04L 65/4038; H04L 67/02
See application file for complete search history.

(56) References Cited

U.S. PATENT DOCUMENTS

| | | | |
|---|---|---|---|
| 6,272,214 B1 | 8/2001 | Jonsson | |
| 6,604,129 B2 | 8/2003 | Slutsman et al. | |
| 8,239,236 B2 | 8/2012 | Mansour | |
| 8,250,141 B2 | 8/2012 | Xiao et al. | |
| 2003/0233265 A1 | 12/2003 | Lee | |
| 2006/0182249 A1* | 8/2006 | Archambault | H04L 12/1818 379/202.01 |
| 2009/0179983 A1 | 7/2009 | Schindler | |
| 2009/0192845 A1 | 7/2009 | Gudipaty | |
| 2009/0222519 A1 | 9/2009 | Boyd | |
| 2010/0246448 A1 | 9/2010 | Krantz et al. | |
| 2011/0167356 A1* | 7/2011 | Mansour | G06Q 10/06311 715/751 |
| 2012/0136689 A1 | 5/2012 | Ickman | |
| 2012/0278381 A1* | 11/2012 | Ferlitsch | G06Q 10/109 709/203 |
| 2013/0018950 A1 | 1/2013 | Narayanan et al. | |
| 2013/0110925 A1 | 5/2013 | Wessling et al. | |
| 2015/0067044 A1 | 3/2015 | Bakaev | |
| 2015/0149231 A1 | 5/2015 | Nicolas et al. | |

OTHER PUBLICATIONS

Rasmussen, Jens Trier, "Join button missing on Lync Meetings from federated partners", Published on: Apr. 8, 2013 Available at: http://blogs.technet.com/b/jenstr/archive/2013/04/08/join-button-missing-on-lync-meetings-from-federated-partners.aspx.

(Continued)

*Primary Examiner* — Padma Mundur
(74) *Attorney, Agent, or Firm* — Workman Nydegger

(57) ABSTRACT

Converting an off-line meeting to an on-line meeting. A method includes, at a communal meeting device, receiving user input requesting access to an off-line meeting. The method further includes, as a result, prompting an organizer of the meeting to update the meeting to an on-line meeting.

20 Claims, 8 Drawing Sheets

(56) References Cited

OTHER PUBLICATIONS

"Join a video call—Chromebox for meetings Help", Published on: Apr. 6, 2015 Available at: https://support.google.com/chromeboxformeetings/answer/3341433?hl=en.

"What's New—GoToMeeting", Retrieved on: Oct. 1, 2015 Available at: http://support.citrixonline.com/en_US/Meeting/help_files/G2M010012.

"Add video calls to Microsoft Outlook® meetings", Published on: Sep. 27, 2015 Available at: https://support.google.com/chromeboxformeetings/answer/4564466#join.

International Search Report and Written Opinion issued in PCT application #PCT/US2016/058416 dated Feb. 16, 2017.

* cited by examiner

JOINING AN ON-LINE MEETING FROM AN OFF-LINE MEETING

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to be used for virtual on-line meetings. In particular different individuals can access computer systems at different locations and can participate in on-line meetings. The interconnected computer systems can share video data, voice data, and other content, such as whiteboards, documents, and a host of other content. Typically, to connect to such on-line meetings, a meeting organizer will send a meeting invite that includes a link to a URL pointing of a location where the meeting can be joined. By selecting the link, users can join the on-line meeting using their computing devices.

While often, users are able to use a personal computing system to access such meetings, there are also communal computing systems that users can use. For example, at an enterprise, a video conferencing room may have a communal device which includes computer hardware that can access on-line meetings. If a meeting organizer intends for user to use a communal device for an on-line meeting, typically the organizer will include the communal device in the list of invitees to the on-line meeting. When a user at the communal device wishes to access the on-line meeting, the user will access a calendar at the communal device to identify the meeting invite for the communal device. The user can then select the link in the meeting invite to access the on-line meeting.

One problem that arises in the on-line meeting context is when an organizer attempts to schedule an on-line meeting, but instead schedules a local or off-line meeting. When a user at the communal device accesses the meeting invite and attempts to access the on-line meeting at the communal device, the user will find that there is no link to the on-line meeting as one has not been scheduled. Thus, users can experience frustration when they expect to join on line meetings at communal devices when there have been mistakes in scheduling the on-line meetings.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in an on-line meeting environment. The method includes acts for converting an off-line meeting to an on-line meeting. The method includes, at a communal meeting device, receiving user input requesting access to an off-line meeting. The method further includes, as a result, prompting an organizer of the meeting to update the meeting to an on-line meeting.

Another embodiment may be practiced in an on-line meeting environment. The method includes acts for scheduling an on-line meeting corresponding to an off-line meeting. The method includes, at a communal meeting device, receiving user input requesting access to an off-line meeting. The method further includes, as a result, creating a new meeting invite to schedule a corresponding on-line meeting to the off-line meeting.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described, herein are able to convert an off-line meeting to an on-line meeting, or to schedule a corresponding on-line meeting to an off-line meeting to allow users at communal devices to join an on-line meeting when an off-line meeting is scheduled, but an on-line meeting was intended or would be more beneficial. This can be done in several different ways. For example, in one embodiment, a communal device may provide a user with a user interface that allows the user to request a change to the meeting from the meeting organizer. The user can send a request to the meeting organizer indicating that the meeting be changed from an off-line meeting to an on-line meeting. Alternatively, the communal device may be able to deduce that an on-line meeting was intended when the organizer sent invites for an off-line meeting, and the communal device can automatically send a request to the organize to update the meeting to an on line meeting (could be done before the meeting). In yet another alternative embodiment, the communal device can schedule an on-line meeting corresponding to the off-line meeting. Thus, the organizer would not need to change the off-line meeting, but rather a parallel on-line meeting could be created, with the communal device as the organizer, and invites to the parallel on-line meeting would be sent to the invitees of the off-line meeting.

Figure 1:
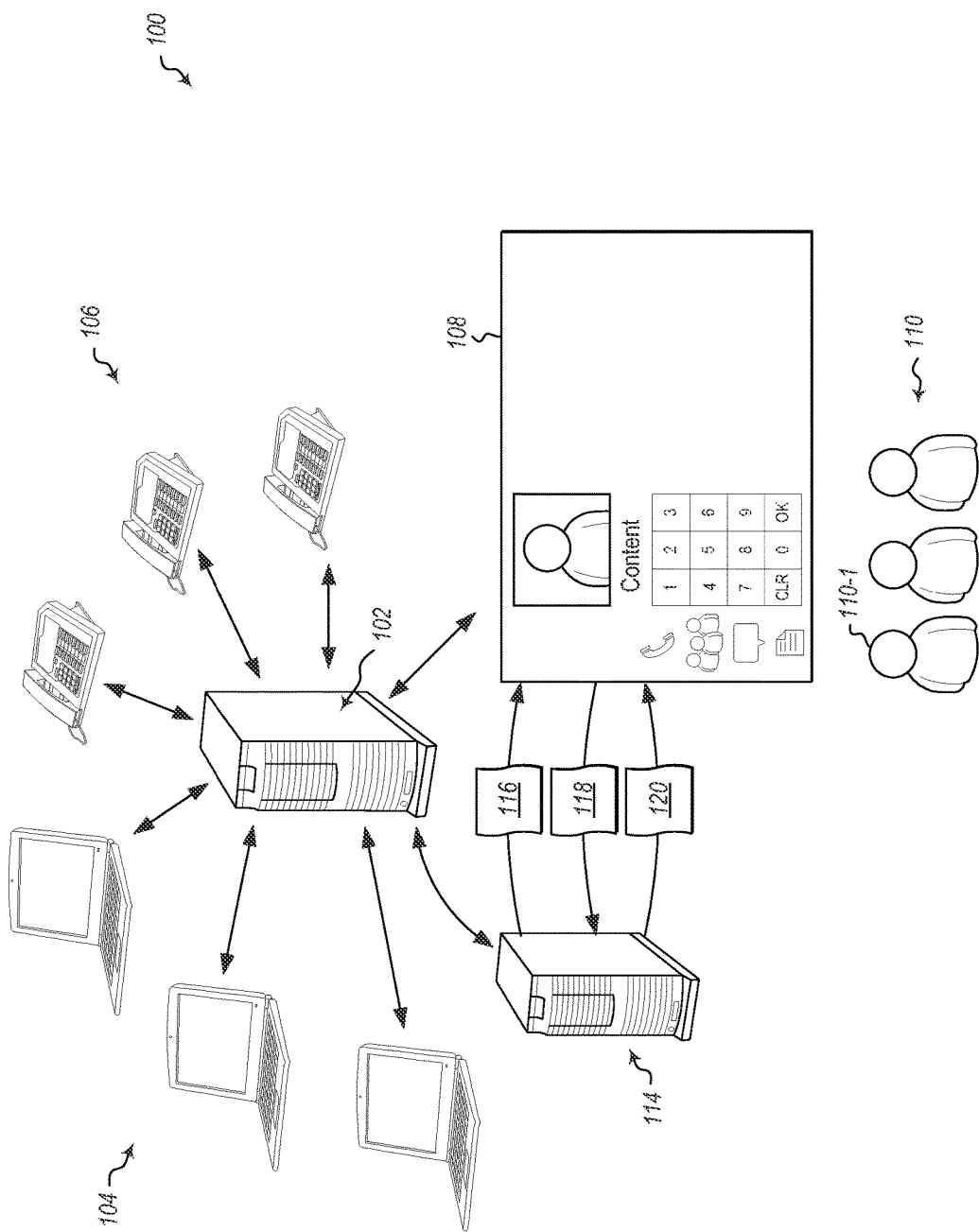
FIG. 1 illustrates an on-line meeting environment.

Referring now to FIG. 1, a content sharing environment 100 is illustrated. The content sharing environment 100 includes an on-line remote server 102. The remote server 102 provides infrastructure for facilitating on-line meetings. For example, the remote server 102 may be a Skype For Business server available from Microsoft Corporation of Redmond, Wash.

Various different devices can connect to the remote server 102 for on-line meetings. For example, FIG. 1 illustrates a s 104 of personal computers. Each of the computers in the set 104 of personal computers may have client software installed on them to allow them to connect to the on-line meeting hosted by the remote server 102. FIG. 1 further illustrates a set 106 of telephones. Each of the telephones in the set 106 of telephones can connect to the on-line meeting hosted by the remote server 102 by calling into a telephone interface. Further, FIG. 1 illustrates a communal device 108. While a single communal device 108 is shown, it should be appreciated that multiple communal devices could be connected to the on-line meeting hosted by the remote server 102.

Figure 2A:
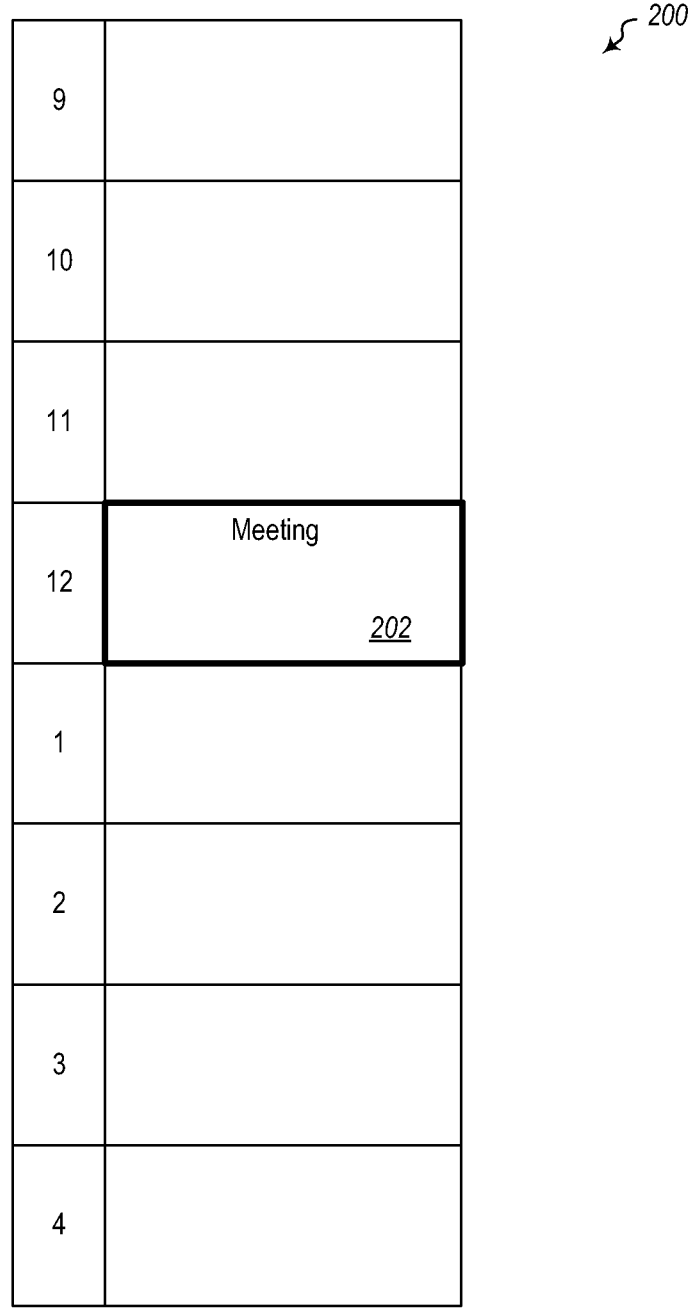
FIG. 2A illustrates a user interface showing a calendar and meeting.

Typically, users are sent invitations, by a meeting organizer to an on-line meeting. The users can join the meeting by supplying the appropriate meeting identification included in the invitation and some type of authentication to authenticate the users to the remote server 102. Often, one or both of these can be provided simply by selecting a link in a meeting invite that includes a URL to the appropriate logical location at the remote server. However, when a communal device 108 is used, the communal device 108 is invited to the meeting and is authenticated to the remote server 102 instead of each of the users 110 at the communal device. For example, FIG. 1 illustrates that the communal device 108 is sent a meeting invite 116 from the email server 114 such that the communal device will then have scheduled a meeting at the communal device 108. Often, a user at the communal device 108 accesses a calendar at the communal device, such as the calendar 200 illustrated, in FIGS. 2A-2C. The calendar 200 includes entries for each meeting to which the communal device 108 has been invited. For example, FIG. 2A illustrates a meeting 202. If the meeting is an on-line meeting, a user 110-1 at the communal device 108 can simply select a link in the meeting from the calendar 200 to cause the communal device 108 to join the on-line meeting. Thus, while users are authenticated to the remote server 102 for users at computers in the set 104 of computers and users are authenticated to the remote server 102 for users at telephones in the set 106 of telephones, the communal device 108 itself is authenticated for a communal device 108.

However, in some instances a meeting organizer may schedule an off-line meeting, such as the meeting 202 illustrated in FIG. 2A. This may be due to the organizer inadvertently scheduling the off-line meeting when an on-line meeting was intended or due to the organizer originally intending to schedule an off-line meeting (which they may later wish to be an on-line meeting).

In such scenarios, a user 110-1 may access the communal device 108. The user 110-1 may identify a calendar invite shown as a meeting on the calendar 200 at the communal device 108 sent to the communal device by the meeting organizer. When the user 110-1 at the communal device 108 attempts to join the on-line meeting, the user will identify that the meeting 202 is an off-line meeting, and therefore there will be no information or links that allow the user to join an on-line meeting.

Embodiments can be implemented to remedy this to allow an on-line meeting to be held in place of, or together with the off-line meeting.

For example, in one embodiment, when the user 110-1 accesses an invite for an off-line meeting, the communal device may also provide the user 110-1 with user interface elements (such as a link or button) that allows the user to request that the organizer of the off-line meeting be notified that the meeting should be changed to an on-line meeting. When the user 110-1 selects the user interface element, this causes the communal device 108 to send a request 118 to the meeting organizer to update the meeting to an on-line meeting. This may be done by starting a new email thread requesting the update. Alternatively, a reply to the original invite may be generated. In some embodiments, the reply may be counter-proposal request to the original invite to the communal device 108.

Figure 3A:
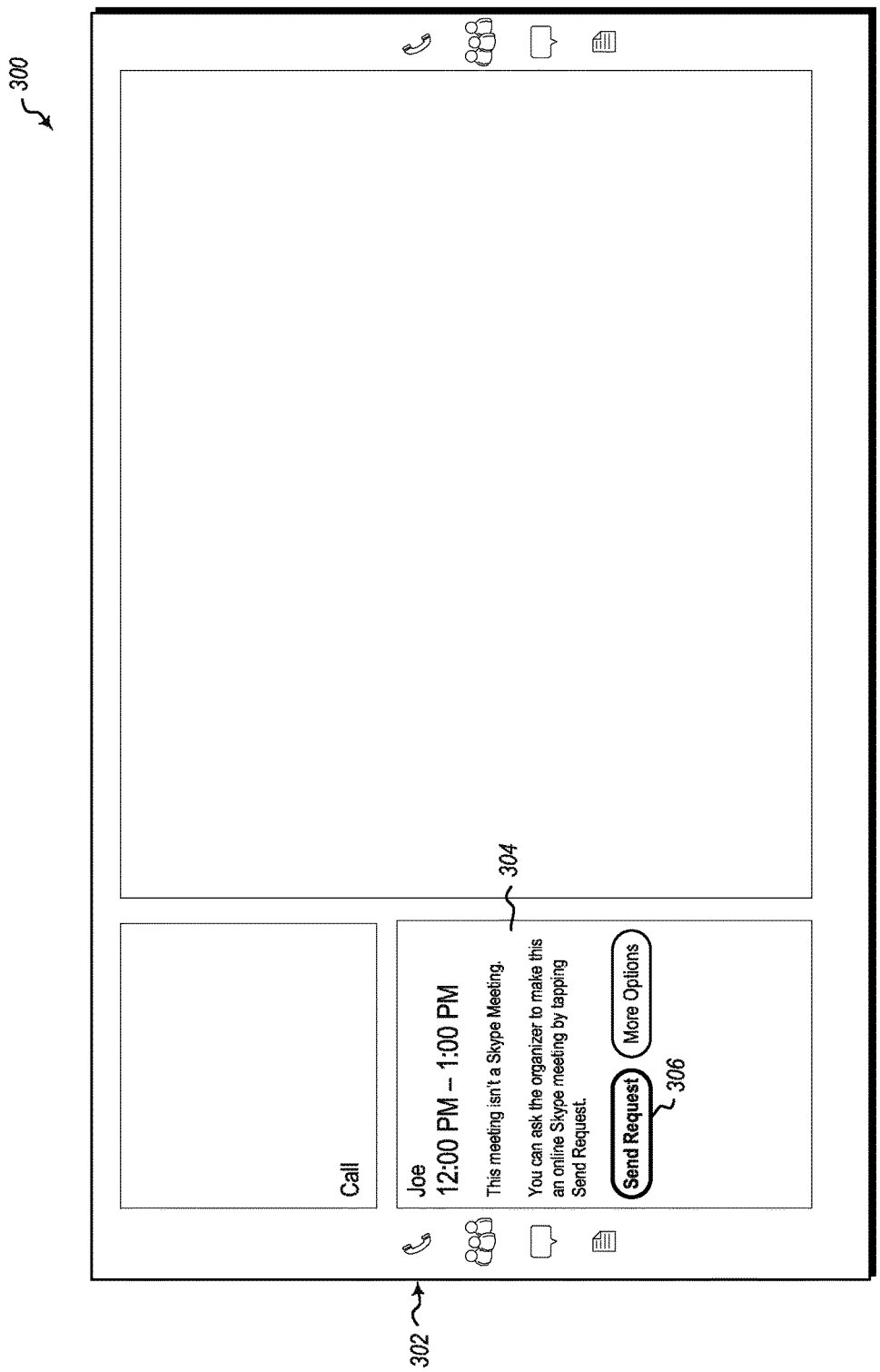
FIG. 3A illustrates a meeting interface including a button for requesting that a meeting be updated to an on-line meeting.
Figure 3B:
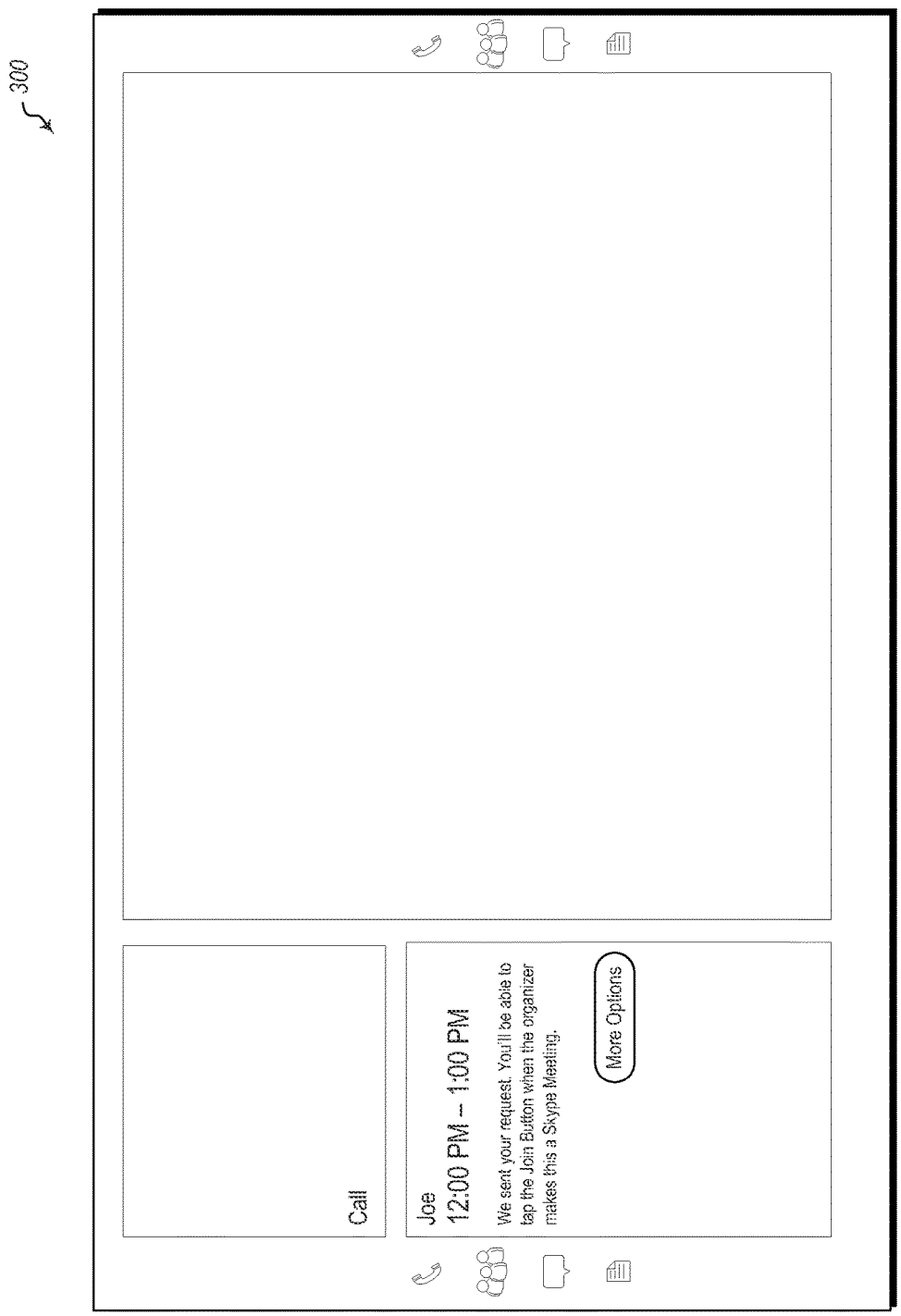
FIG. 3B illustrates a meeting interface which includes a indication that a request has been sent to a meeting organizer.

An example of such functionality is now illustrated with reference to FIG. 3A-3C. FIG. 3A illustrates a meeting interface 300. The meeting interface may be displayed at the communal device 108 when the user selects the meeting 202 from the calendar 200. In the illustrated example, the user 110-1 can select a call element 302. At this point, the communal device recognizes that the user 110-1 is attempting to access an on-line meeting, whereas the meeting 202 is an off-line meeting. As such, the communal device will display in the meeting interface text 304 indicating that the meeting is not an on-line meeting and indicating to the user that they can ask the organizer to make the meeting 202 an on-line meeting. The meeting interface 300 further includes elements that allow the user to request the change to the meeting 202. In particular, FIG. 3A illustrates that the communal device 108 provides a button 306 in the meeting interface that allows the user 110-1 to request that the meeting 202 be changed from an off-line meeting to an on-line meeting.

In the illustrated example, when the user 110-1 selects the button 306, the communal device 108 will use an email client at the communal device to send a request to the meeting organizer through the email server 114 and update the meeting interface 300 to indicate that a request has been sent to the meeting organizer. An example of this is illustrated in FIG. 3B.

Figure 3C:
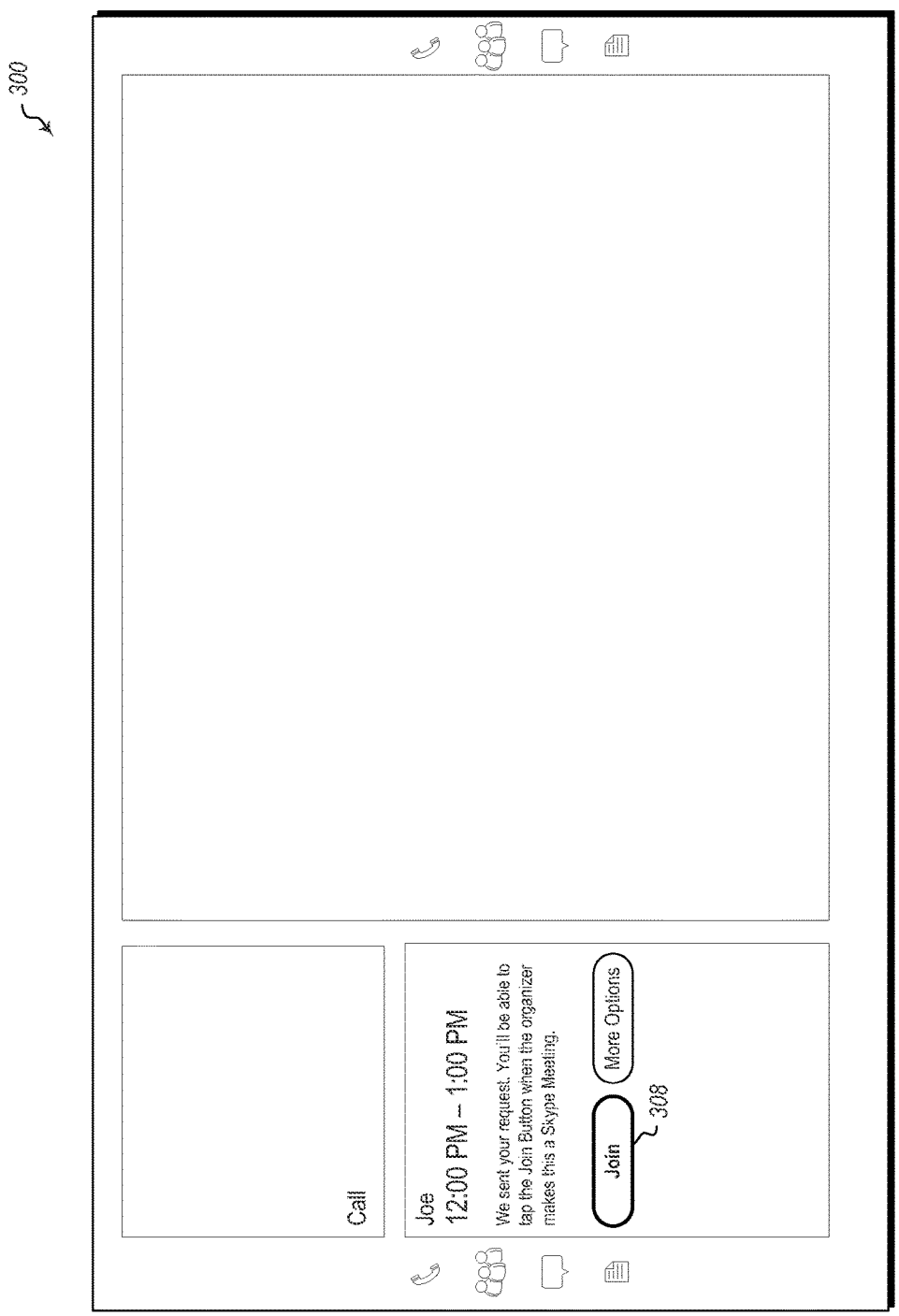
FIG. 3C illustrates a meeting interface including a button for requesting to join the updated meeting as an on-line meeting.

As illustrated in FIG. 3C, once the meeting organizer has updated the meeting 202 to be an on-line meeting, the meeting interface 300 will be updated to include a join button 308. When the user 110-1 selects this button 308, the communal device 108 will be connected to the on-line meeting.

Figure 2B:
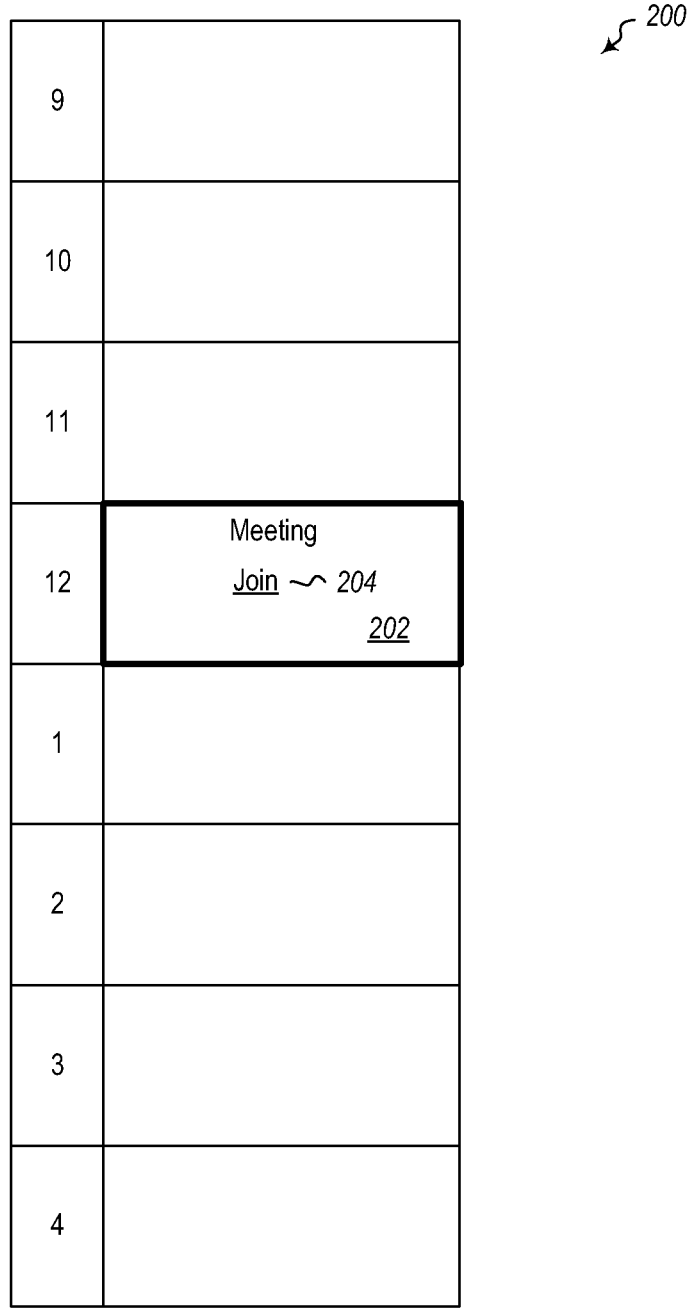
FIG. 2B illustrates the user interface showing a calendar and updated meeting.
Figure 2C:
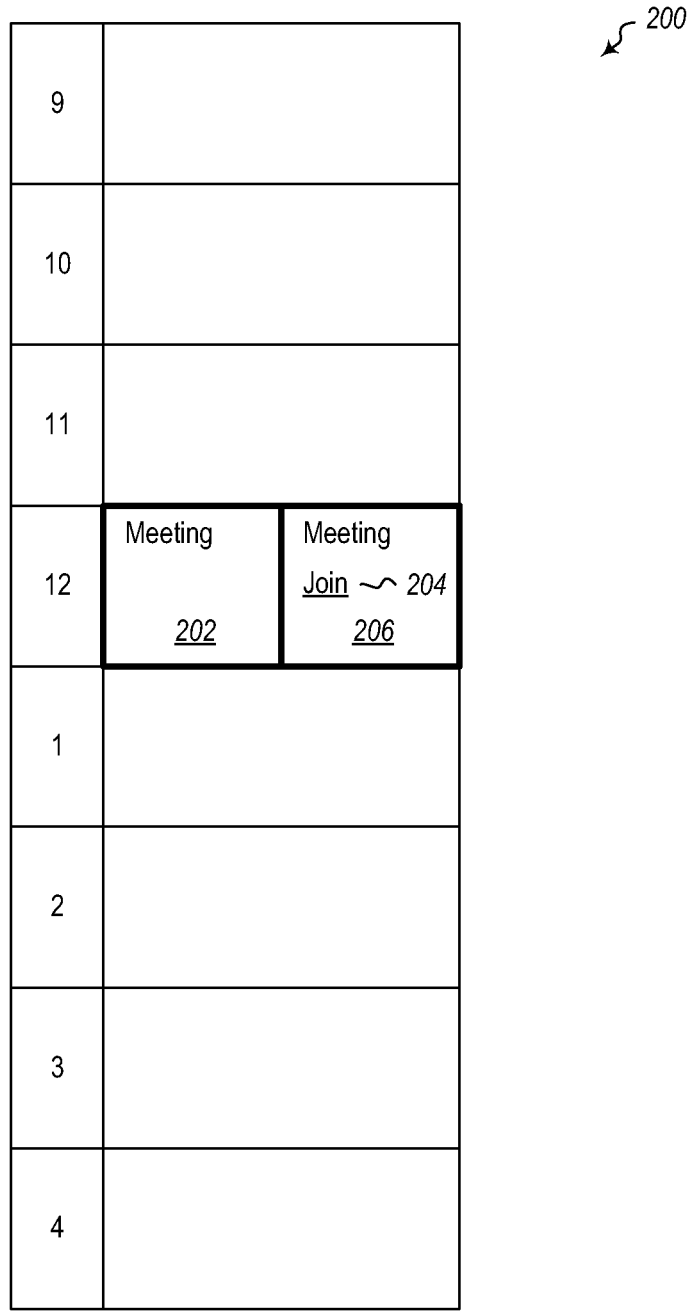
FIG. 2C illustrates the user interface showing a calendar, a meeting and a corresponding on-line meeting.

In some embodiments, as illustrated in FIG. 2B, the calendar 200 may be updated to show that the meeting 202 is updated with a link 204 allowing a user 110-1 to select the link 204 to allow the communal device 108 to join the meeting 202, which is now an on-line meeting.

In some embodiments, the communal device 108 may be configured to automatically detect that an on-line meeting was likely intended in-spite of an off-line meeting being scheduled by the organizer. For example, if two or more communal devices are invited to an off-line meeting, this likely indicates that the meeting should be an on-line meeting. Alternatively, location of other invitees to the meeting and/or other calendar items for the invitees near the scheduled meeting might indicate if the meeting should be an on-line meeting. For example, if some invitees have other meetings the same day as the scheduled meeting where some of those meetings are in Seattle, Wash. and other invites have meetings in Shanghai, China, and this information can be identified by the communal device 108 by viewing public calendar properties, the communal device 108 may be able to identify that an on-line meeting was intended or that an on-line meeting would be preferable. In this case, the communal device 108 could automatically, without the user intervention illustrated in FIG. 3A-3C, send an indication to the organizer to update the meeting 202 to be changed from an off-line meeting to an on-line meeting.

Further, in some such embodiments, the communal device 108 could automatically send the indication to the organizer as soon as the communal device 108 is able to identify that the meeting should be an on-line meeting. Thus, the communal device 108 does not need to wait until the meeting start time, or a time proximate the meeting start time, to send the indication to the organizer.

In response to sending the request 118 from the communal device to the email server 114 (and n particular to the meeting organizer who can access the request 118 using the email server), the meeting organizer can update the meeting 202 to an on-line meeting, which causes an updated meeting invite 120 to be sent to the communal device 108 and the other invitees. A user 110-1 at the communal device can then access the updated meeting 202 as an on-line meeting.

In alternative embodiments, the communal device 108 could schedule a parallel meeting to the off-line meeting. In particular, the communal device 108 may, with user input, or automatically schedule an on-line meeting that corresponds to an existing off-line meeting. For example, in some embodiments, a user 110-1 may access the communal device 108 to access an off-line meeting to which the communal device 108 has been invited. This may be done, for example, by the user 110-1 accessing a calendar 200 at the communal device 108 that has the meeting 202 as an off-line meeting scheduled thereon. The user can select the meeting 202 from the calendar 200. At this point, the user can look at the meeting properties and identify that the meeting 200 is an off-line meeting and not an on-line meeting. For example, as illustrated in FIG. 2A, the meeting 202 does not have a link to join an on-line meeting. The communal device 108 can provide the user with an interface to schedule a parallel on-line meeting to the off-line meeting. For example, in some embodiments the communal device 108 may provide the user 110-1 with an interface similar to that illustrated in FIG. 3A, except that the meeting interface 300 may include a button that allows the user to cause the communal device 108 to schedule another meeting that parallels the meeting 202, but that is an on-line meeting.

In some embodiments, the communal device may auto-populate the parallel on-line meeting invite from the existing off-line meeting invite sent to the communal device. For example, the communal device can examine the off-line meeting and extract various properties to auto-populate information for a corresponding on-line meeting. Such properties may include the invitee list, the subject line of the meeting, the body of the meeting, any attachments for the meeting, etc. The auto-populated meeting request can be sent from the communal device 108 automatically without the user 110-1 needing to manually define the meeting properties for the corresponding on-line meeting. Rather, the user 110-1 can select a single interface button (or other element) which causes a separate meeting 206 (see FIG. 2C) to be created, automatically populated, and automatically sent to the same meeting invitees as the original meeting 202.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
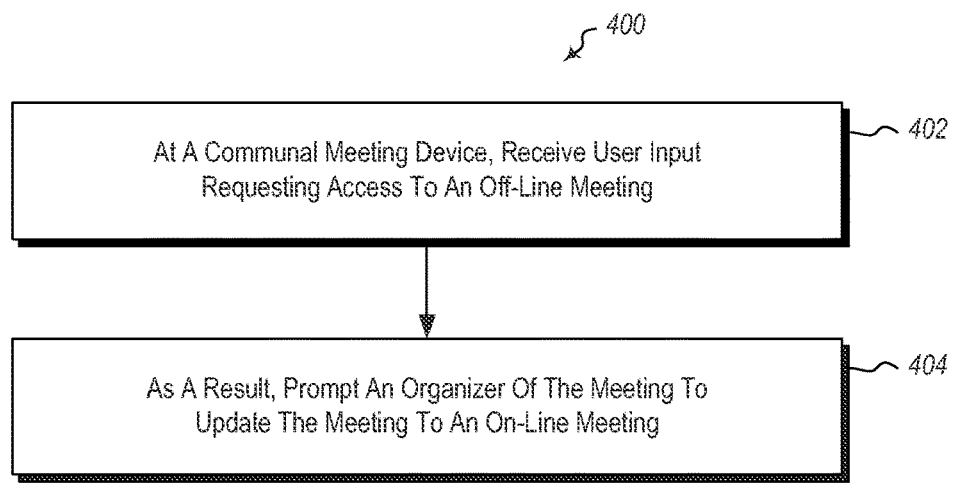
FIG. 4 illustrates a method of converting an off-line meeting to an on-line meeting.

Referring now to FIG. 4, a method 400 is illustrated. The method 400 may be practiced in an on-line meeting environment and includes acts for converting an off-line meeting to an on-line meeting. The method 400 includes at a communal meeting device, receiving user input requesting access to an off-line meeting (act 402). As illustrated above, the user 110-1 may attempt to access a meeting 202, such as by accessing the calendar 200. In some embodiments, this may include the user selecting a call user interface element indicating that the user is attempting to join an on-line meeting.

The method 400 further includes, as a result, prompting an organizer of the meeting to update the meeting to an on-line meeting (act 404).

In some embodiments, the method 400 may include automatically identifying that the meeting is supposed to be an on-line meeting and wherein prompting comprises automatically sending a message back to a meeting organizer. To some embodiments, automatically identifying that the meeting is supposed to be an on-line meeting may be performed based on invitees invited to a meeting and/or other calendar items in calendars for the invitees, the fact that two or more communal devices have been invited to the meeting, and/or other factors.

The method 400 may further include providing an indicator to a user indicating that the meeting is an off-line meeting and wherein prompting comprises sending a message back to a meeting organizer as a result of user input responding to the indicator to the user indicating that the meeting is an off-line meeting. For example, as illustrated above in FIG. 3A, a button 306 is provided that allows a user to initiate the communal device sending a message to a meeting organizer requesting that the meeting be updated to an on-line meeting.

The method 400 may further include receiving user input from the organizer at the communal device, and as a result updating the meeting to an on-line meeting at the communal device. In particular, the organizer may be at the communal device and may be able to provide credentials at the communal device to authenticate the organizer to the communal device. As such, the organizer can request, at the communal device that the meeting be updated to an on-line meeting.

Similarly, the method 400 may further include receiving user input from a presenter selected by the organizer at the communal device, and as a result updating the meeting to an on-line meeting at the communal device. For example, the organizer may give another user authority to change the meeting from an off-line meeting to an on-line meeting. For example, this may be done by the organizer designating another user as a presenter. The presenter can then update the meeting type at the communal device by authenticating to the communal device.

The method 400 may farther include receiving user input from a user at the communal device including authentication for the user, and as a result updating the meeting to an on-line meeting at the communal device. Thus, appropriate users with appropriate authentication credentials may have authority to request that the communal device update the meeting from an off-line meeting to an on-line meeting.

The method 400 may further include determining that the meeting has been updated to an on-line meeting, and as a result automatically joining the communal device to the meeting. Thus, while FIG. 3C illustrates a join button 308 that allows a user to manually join an on-line meeting, in some embodiments, the communal device may simply automatically join the meeting.

The method 400 may further include determining that the meeting has been updated to an on-line meeting and as a result prompting a user to join the communal device to the meeting. Thus, as illustrated in FIG. 3C, a user may be prompted to join the on-line meeting, such as by providing a join button 308 or other element.

Figure 5:
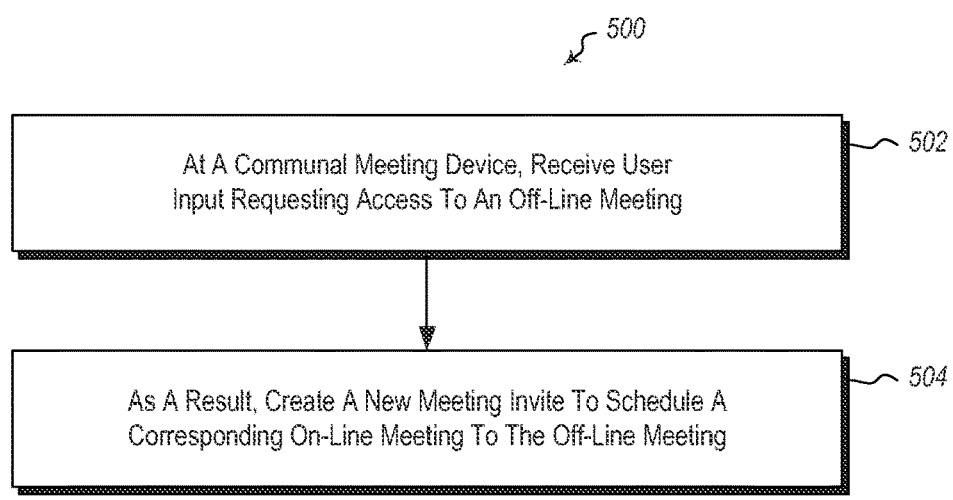
FIG. 5 illustrates a method of scheduling an on-line meeting corresponding to an off-line meeting.

Referring now to FIG. 5, another method is illustrated. The method 500 may be practiced in an on-line meeting environment. The method 500 includes acts for scheduling an on-line meeting corresponding to an off-line meeting. The method 500 includes at a communal meeting device, receiving user input requesting access to an off-line meeting (act 502).

The method 500 further includes as a result, creating a new meeting invite to schedule a corresponding on-line meeting to the off-line meeting (act 504).

The method 500 may be practiced where the organizer for the on-line meeting is the communal device.

In some embodiments, the corresponding on-line meeting may have various element auto-populated. For example, a participant list, or list of invitees, for the on-line meeting may be automatically populated from the off-line meeting invite. Alternatively or additionally, a subject for the on-line meeting is automatically populated from the off-line meeting invite. Alternatively or additionally, a meeting body for the on-line meeting is automatically populated from the off-line meeting invite. Alternatively or additionally, any attachments for the on-line meeting are automatically populated from the off-line meeting invite.

In some embodiments, the method 500 further includes sending a cancellation request for the off-line meeting. Thus, for example, in some embodiments, the communal device may automatically send a cancellation or decline request for the off-line meeting.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a participant computing device utilized for scheduling an online meeting, a method of the participant computing device converting an off-line meeting to an on-line meeting, the method comprising:
    at the participant computing device, receiving an indication of a scheduled meeting that includes a plurality of meeting criteria, including a first criteria designating the scheduled meeting as an off-line meeting;
    as a result of receiving the indication, and based on one or more additional criteria in the indication, automatically determining that the first criteria of the indication was intended to designate the meeting as an on-line meeting, wherein the one or more additional criteria comprises at least one of identity information, location information, calendar information, or scheduling information for one or more invitee or computing device associated with the meeting, and further wherein the determining is based on identifying a conflict between the first criteria designating the meeting as an off-line meeting and the one or more additional criteria;
    based at least on determining that the one or more additional criteria conflicts with the first criteria designating the meeting as an off-line meeting, the participant computing device automatically prompting an organizer computing device to update the meeting to an on-line meeting with an updated indication that changes the first criteria to designate the scheduled meeting as an on-line meeting;
    receiving, at the participant computing device, the updated indication from the organizer computing device; and
    updating the participant computing device with the updated indication.

2. The method of claim 1 further comprising receiving user input from the organizer at the participant computing device in response to sending a message to the meeting organizer indicating the meeting is an off-line meeting, and as a result updating the meeting to an on-line meeting at the participant computing device.

3. The method of claim 1 further comprising receiving user input from a presenter selected by the organizer at the participant computing device, and as a result updating the meeting to an on-line meeting at the participant computing device.

4. The method of claim 1 further comprising receiving user input from a user at the participant computing device including authentication for the user, and as a result updating the meeting to an on-line meeting at the participant computing device.

5. The method of claim 1, further comprising determining that the meeting has been updated to an on-line meeting and as a result automatically joining the participant computing device to the meeting.

6. The method of claim 1, further comprising determining that the meeting has been updated to an on-line meeting and as a result prompting a user to join the participant computing device to the meeting.

7. In an on-line meeting environment, a method of converting an off-line meeting to an on-line meeting, the method comprising:
    at a participant computing device, receiving an indication of a scheduled meeting that includes a plurality of meeting, including a first criteria designating the scheduled meeting as an off-line meeting;
    as a result of receiving the indication, and based on one or more additional criteria in the indication, automatically determining that the first criteria of the indication was intended to designate the meeting as an on-line meeting, wherein the one or more additional criteria comprises at least one of identity information, location information, calendar information, or scheduling information for one or more invitee or computing device associated with the meeting, and further wherein the determining is based on identifying a conflict between the first criteria designating the meeting as an off-line meeting and the one or more additional criteria;
    based at least on determining that the one or more additional criteria conflicts with the first criteria designating the meeting as an off-line meeting, the participant computing device automatically prompting an organizer computing device to update the meeting to an on-line meeting with an updated indication that changes the first criteria to designate the scheduled meeting as an on-line meeting;
    receiving, at the participant computing device, the updated indication from the organizer computing device; and
    updating the participant computing device with the updated indication.

8. The method of claim 7, wherein a participant list for the on-line meeting is automatically populated from the off-line meeting invite.

9. The method of claim 7, wherein a subject for the on-line meeting is automatically populated from the off-line meeting invite.

10. The method of claim 7, wherein a meeting body for the on-line meeting is automatically populated from the off-line meeting invite.

11. The method of claim 7, wherein any attachments for the on-line meeting are automatically populated from the off-line meeting invite.

12. The method of claim 7, further comprising sending a cancellation request for the off-line meeting.

13. A system for converting an off-line meeting to an on-line meeting, the system comprising:
one or more processors; and
one or more computer-readable media having stored thereon instructions that are executable by the one or more processors to configure the computer system to perform at least the following:
at a participant computing device, receiving an indication of a scheduled meeting that includes a plurality of meeting, including a first criteria designating the scheduled meeting as an off-line meeting;
as a result of receiving the indication, and based on one or more additional criteria in the indication, automatically determining that the first criteria of the indication was intended to designate the meeting as an on-line meeting, wherein the one or more additional criteria comprises at least one of identity information, location information, calendar information, or scheduling information for one or more invitee or computing device associated with the meeting, and further wherein the determining is based on identifying a conflict between the first criteria designating the meeting as an off-line meeting and the one or more additional criteria;
based at least on determining that the one or more additional criteria conflicts with the first criteria designating the meeting as an off-line meeting, the participant computing device automatically prompting an organizer computing device to update the meeting to an on-line meeting with an updated indication that changes the first criteria to designate the scheduled meeting as an on-line meeting;
receiving, at the participant computing device, the updated indication from the organizer computing device; and
updating the participant computing device with the updated indication.

14. The system of claim 13, wherein the one or more computer-readable media have stored thereon instructions that are executable by the one or more processors to configure the computer system to provide an indicator to a user indicating that the meeting is an off-line meeting and wherein prompting comprises sending a message back to a meeting organizer as a result of user input responding to the indicator to the user indicating that the meeting is an off-line meeting.

15. The system of claim 13, wherein the one or more computer-readable media have stored thereon instructions that are executable by the one or more processors to configure the computer system to determine that the meeting has been updated to an on-line meeting and as a result prompting a user to join the participant computing device to the meeting.

16. The method of claim 1, wherein the location information for the one or more invitees associated with meeting comprises the location of the invitee during a time of the scheduled meeting.

17. The method of claim 1, wherein the calendar information for the one or more invitees associated with meeting comprises information about one or more scheduled events on a public calendar for the invitee occurring prior to the meeting.

18. The method of claim 1, wherein the location information for the one or more computing devices associated with the meeting includes identifying that at least two different computing devices associated with the meeting are located in two different physical locations.

19. The method of claim 1, wherein the location information for the one or more invitees associated with the meeting includes identifying that at least two invitees associated with the meeting are located in two different physical locations.

20. The method of claim 1, wherein determining the physical location of one or more invitees associated with the meeting is based on calendar information for the one or more invitees.

* * * * *